United States Patent
Watanabe (10) Patent No.: US 7,471,877 B2
(45) Date of Patent: Dec. 30, 2008

(54) IMAGE RECORDER AND METHOD AND PROGRAM FOR DISPLAYING RECORDED IMAGES

(75) Inventor: Gaku Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 842 days.

(21) Appl. No.: 11/007,091

(22) Filed: Dec. 7, 2004

(65) Prior Publication Data

US 2005/0141855 A1 Jun. 30, 2005

(30) Foreign Application Priority Data

Dec. 12, 2003 (JP) ............... 2003-415695

(51) Int. Cl.
*H04N 7/08* (2006.01)
*H04N 5/91* (2006.01)
*H04N 5/00* (2006.01)
*H04N 7/16* (2006.01)
*G06F 3/00* (2006.01)

(52) U.S. Cl. ............... 386/92; 386/108; 386/117; 725/153; 715/716; 715/717

(58) Field of Classification Search ............... 386/46, 386/55, 92, 107, 108, 117; 725/55, 58, 59, 725/153; 715/716, 717, 718
See application file for complete search history.

(56) References Cited

U.S. PATENT DOCUMENTS

| | | | | |
|---|---|---|---|---|
| 5,933,137 A | * | 8/1999 | Anderson | 715/720 |
| 6,134,380 A | * | 10/2000 | Kushizaki | 386/55 |
| 7,349,000 B2 | * | 3/2008 | McDonald et al. | 715/719 |
| 7,363,644 B2 | * | 4/2008 | Wugofski | 725/40 |
| 2001/0033734 A1 | * | 10/2001 | Hoda et al. | 386/46 |
| 2003/0110227 A1 | * | 6/2003 | O'Hagan | 709/206 |
| 2004/0175096 A1 | * | 9/2004 | Caspi et al. | 386/46 |

FOREIGN PATENT DOCUMENTS

JP 10-228687 A 8/1998

* cited by examiner

*Primary Examiner*—Thai Tran
*Assistant Examiner*—Hung Q Dang
(74) *Attorney, Agent, or Firm*—Canon USA Inc IP Div (57) ABSTRACT

An image recording method and system according to the present invention includes an image-recorder unit, which records images acquired by different image-obtaining units such as a digital camera and a digital video camera. The system also includes a time period displaying unit which displays time periods indicating different time periods on a screen, and a recorded image-display unit, which displays information about images recorded by the image-recorder unit on the screen for each of the different image-obtaining units so that a time related to each of the images acquired is displayed relative to times indicated by the time periods.

20 Claims, 4 Drawing Sheets

IMAGE RECORDER AND METHOD AND PROGRAM FOR DISPLAYING RECORDED IMAGES

BACKGROUND OF THE INVENTION

1. Field of the Invention

The present invention relates generally to image recording systems and methods and more specifically to image recording systems and methods for recording and displaying a plurality of images.

2. Description of the Related Art

Conventional image recorders for recording television programs and the like are well known. Although such recording devices typically employ a tape medium for recording images, there has been a recent shift toward the use of high-capacity hard disk storage devices. These new recorder types are capable of not only receiving television signals but are also capable of storing images captured by digital and video cameras on the built-in hard disks. A recorder of this type can also obtain a television program listing by connecting to the Internet. By using this television program listing, a user can easily program and record a television program. The user can also view images captured by digital cameras and video cameras recorded on a medium.

However, conventional image recorders are known to have various disadvantages. For example, images of recorded television programs and images of content recorded by different types of imaging systems (e.g., digital camera or digital video camera) cannot be viewed in relation to time content. Therefore, the chronological relationship between the images captured by different types of imaging systems or the chronological relationship between the recorded images of television programs is not known.

These images also cannot be viewed in relation to the viewer's schedule. For this reason, the chronological relationship between the user's future schedule and the television program the user wants to watch is unknown. As a result, the user may not be able to record the desired television program or may record a television program that has already been recorded. Moreover, the user may inadvertently print out a previously printed recorded image, because no records of prior printouts were kept.

SUMMARY OF THE INVENTION

Among other advantages, the image recorder systems and methods of the present invention can display recorded images in a manner that indicates and preserves the chronological relationship between images of recorded television programs and images acquired by different image-obtaining units. Another advantage is that the present invention provides image recorder systems and methods that manage a user's schedule together with other images to enable the user to grasp the chronological relationship between the user's schedule and recorded images by viewing information about the recorded images on a screen. The present invention has taken into consideration the above-mentioned problems and provides an image recorder including a image-recording unit which records images acquired from different image-obtaining units, a time period displaying unit which displays time periods including hours and minutes on a display, and a recorded image-displaying unit which displays the images recorded by each of the image-obtaining units on the display so that the times related to the recorded images are displayed in accordance with the displayed time periods.

The image recorder according to the present invention comprises an image-recording unit which records images acquired by different image-obtaining units, a time period displaying unit which displays time periods indicating different time periods on a screen, and a recorded image-displaying unit which displays information of the images recorded by the image-recording unit on the screen for each of the different images obtaining units so that a time related to each of the images acquired by the different image-obtaining units are displayed in accordance with the time indicated by the time periods.

A method for displaying a recorded image comprising an image recording step of recording images acquired by different image-obtaining units, a time period displaying step of displaying time periods indicating different time periods on a screen, and a recorded image displaying step of displaying information of the images recorded in the image recording step on the screen for each of the different images obtaining units so that a time related to each of the images acquired by the different image-obtaining units are displayed in accordance with the time indicated by the time periods.

A program executed by a CPU included in an image recorder, the program comprising an image recording step of recording images acquired by different image-obtaining units, a time period displaying step of displaying time periods indicating different time periods on a screen, and a recorded image displaying step of displaying information of the images recorded in the image recording step on the screen for each of the different images obtaining units so that a time related to each of the images acquired by the different image-obtaining units are displayed in accordance with the time indicated by the time periods.

Since the image recorder according to the first aspect of the present invention obtains different images from different image-obtaining units and recorded and displayed these images on a screen so that a time related to each of the acquired images are displayed in accordance with the time indicated by the time periods, the chronological relationship between images acquired from different image-obtaining units, e.g., images captured by different types of imaging systems or images of recorded television programs, can be easily understood.

In the image recorder according to the third aspect of the present invention, the chronological relationship between images captured by a plurality of imaging systems and images of recorded television programs can be understood. In the image recorder according to the fourth aspect of the present invention, the user's schedule can be managed together so that the chronological relationship between the user's schedule and the recorded image can be grasped when viewing a recorded image. In this way, the same image can be prevented from being recorded twice. In the image recorder according to the sixth and seventh aspects of the present invention, the chronological relationship of communication records of telephone calls and transmission and reception records of E-mail messages can also be understood. In the image recorder according to the twelfth aspect of the present invention, a desired image can be easily retrieved from a large amount of image data stored on a recording medium by displaying thumbnails. In the image recorder according to the thirteenth aspect of the present invention, the number of images (static and moving) captured in a particular time period can be easily known. In the image recorder according to the sixteenth aspect of the present invention, the operation for programmed recording can be carried out reliably. In the image recorder according to the seventeenth aspect of the present invention, unnecessary printouts of images that have already been printed out can be prevented.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the present invention will be described in detail in accordance with the accompanying drawings.

First Embodiment

An image recorder and a method and program for displaying recorded images according to an embodiment of the present invention will be described with reference to the drawings.

[Overview]

Figure 1:
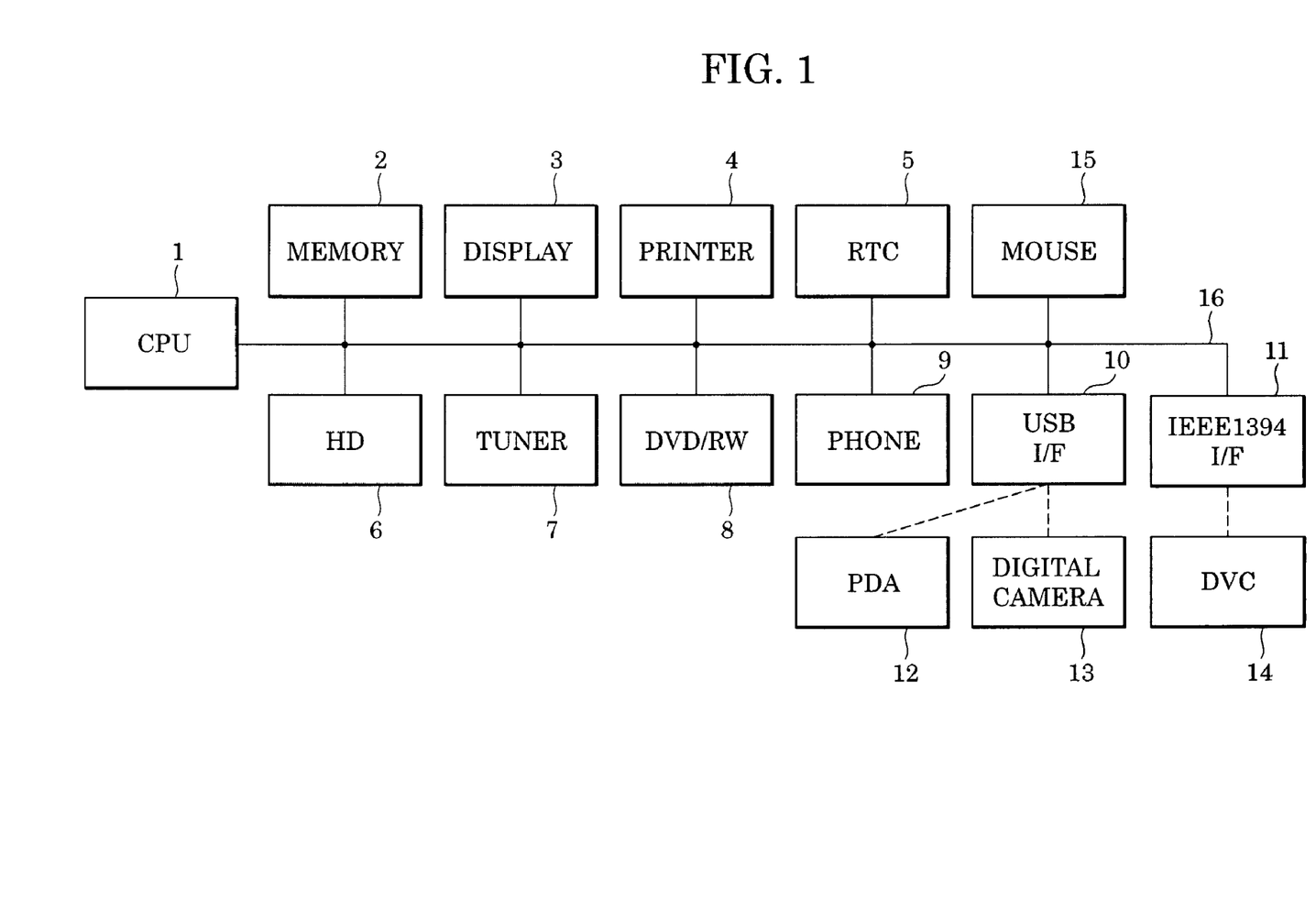
FIG. 1 is a block diagram of the structure of an image recorder according to an embodiment of the present invention.

FIG. 1 is a block diagram of the structure of an image recorder according to an embodiment of the present invention. The image recorder includes a CPU 1, a memory 2, a CRT display 3, a printer 4, a real-time clock (RTC) 5, a hard disk (HD) 6, a television tuner 7, a magnetic optical disk recorder (DVD/RW) 8, a telephone 9, a USB interface (I/F) 10, an IEEE1394 interface (I/F) 11, and a mouse which are connected via a data bus 16.

The CPU 1 is for controlling the overall operation of the image recorder. The CPU 1 exchanges data with the components connected via the data bus 16 and controls these components. The memory 2 is a DRAM. The CPU 1 uses the memory space of the memory 2 for computing control, program execution, and image processing. The CRT display 3 has a built-in video RAM to display images and a user interface based on image data transmitted from the CPU 1. The printer 4 prints out image data as commanded by the CPU 1.

The real-time clock 5 indicates the current time. The real-time clock 5 has a backup battery to maintain the current time even when the main power supply of the image recorder is turned off. The current time may be obtained through any geographically precise time base or may be acquired through television airwaves or the Internet. The CPU 1 according to this embodiment obtains the current time through the real-time clock 5. When a time scheduled for recording by the user arrives, the CPU 1 commands the hard disk 6 to record the image of a television program received by the television tuner 7. The hard disk 6 has a high-capacity recording medium and, in this embodiment, is mainly used for recording image data. The hard disk 6 also stores control programs to be executed by the CPU 1.

The television tuner 7 is capable of receiving public broadcasting through airwaves or cable. The digital image data output from the television tuner 7 is stored on the hard disk 6 or displayed on the CRT display 3 in accordance with commands from the CPU 1. The magnetic optical disk recorder 8 has a high-capacity read/write recording medium. When instructed by the user, the CPU 1 transfers the image data stored on the hard disk 6 to the magnetic optical disk recorder 8 to create a backup. Similarly, in a case in which a radio tuner (not depicted in the drawing) is used, audio data output from the radio tuner will be stored on the hard disk 6 and titles of radio programs will be displayed.

The telephone 9 is used by the CPU 1 to access an external network, such as the Internet. The CPU 1 is capable of connecting to the Internet via a phone line connected to the telephone 9. In this way, the CPU 1 can download television program listings from the Internet and store this listing on the hard disk 6. The user may also use the telephone 9 to dial directly. In such a case, the CPU 1 records the duration of the call and the outgoing telephone number. Incoming telephone numbers may also be recorded. The telephone 9 can also have a telephone answering function.

The USB interface 10 is connected to an external device. The control program stored on the hard disk 6 is updated via the USB interface 10 when required. According to this embodiment, the USB interface 10 is connected to the digital camera 13, which is an external device, to transfer static and moving images captured by the digital camera 13 to the hard disk 6. Also, a portable digital assistant (PDA) 12 is connected to the USB interface 10. The PDA 12 has a small liquid crystal display and is mainly used for managing the user's schedule. By connecting the PDA 12 with the image recorder via the USB interface 10, schedule data stored in the PDA 12 can be transferred to the image recorder. The IEEE1394 interface 11 is connected to an external device. According to this embodiment, the IEEE1394 interface 11 is connected to the video camera 14. In this way, static and moving images captured by the video camera 14 can be transferred to the hard disk 6.

The user can operate the mouse 15 to run various applications stored on the hard disk 6. The image recorder according to this embodiment includes an E-mail application so that a user can transmit and receive E-mail by operating the mouse 15. A keyboard may be connected to the USB interface 10 as an option when text input is desired.

[Display Screen]

Figure 2:
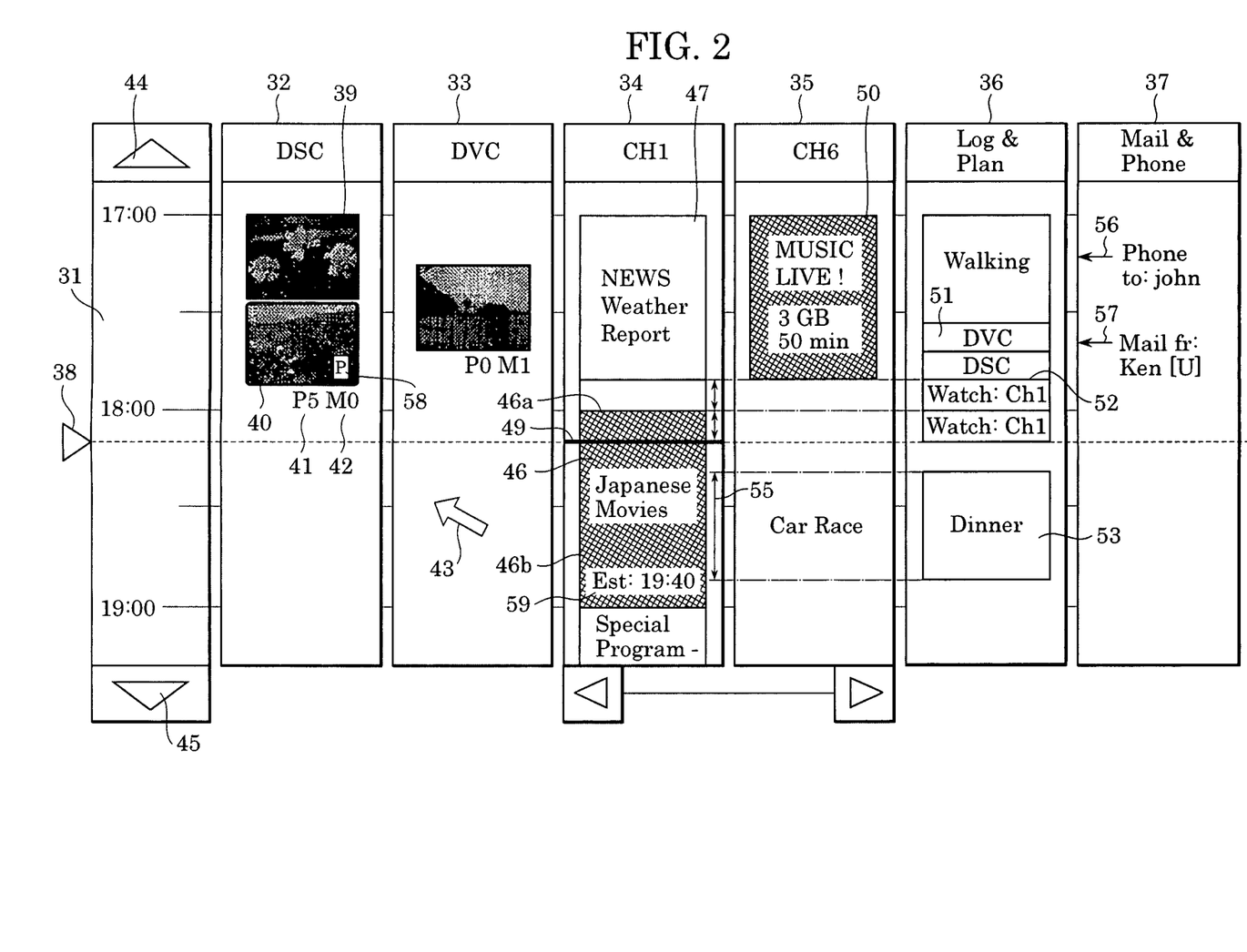
FIG. 2 illustrates a record management screen displayed on a CRT display 3 of an image recorder.

FIG. 2 illustrates a record management screen displayed on the CRT display 3 of the image recorder in accordance with an embodiment of the present invention. The record management screen displays the recorded data in columns that are divided up by time periods. Each of these columns is referred to as a "media" time bar.

The leftmost column in FIG. 2 is a time period column 31. The time period column 31 depicted in FIG. 2 shows a two (2) hour time period from 17:00 to 19:00. A triangular marker 38 indicates the current time. The current time is constantly updated by the real-time clock 5. The CPU 1 scrolls up the displayed time periods so that the current time is always displayed at the center of the screen.

Along with the time period column 31, the media time bars 32, 33, 34, 35, 36 and 37 are displayed. The images stored in the hard disk 6 recorded by the digital camera 13 and the video camera 14 and the television program listing (including information on the recorded television programs and programmed recording) are displayed in the media time bars. In addition, schedules, telephone records, and E-mail records are also displayed in the media time bars.

Captured images are displayed in a media time bar 32. The media time bar 32 chronologically displays thumbnails 39 and 40 that are reduced images of the images captured by the digital camera 13. The CPU 1 displays the thumbnails 39 and 40 in the media time bar 32 by reading out time stamps included in the image data stored on the hard disk 6 and then displays the thumbnails 39 and 40 in areas in the time periods corresponding to the time stamps. In this embodiment, the hard disk 6 stores five additional static images and zero moving images in addition to the images represented by the thumbnails 39 and 40. The CPU 1 tries to display thumbnails of these additional images in areas of the media time bars corresponding to the time periods relevant to the thumbnails. However, in this case, there is insufficient space in the media time bar to display all of the thumbnails. Therefore, only the number of images is indicated for the thumbnails that cannot be displayed in the media time bar due to lack of space. The indication "P5" shows that there are five static images, and the indication "M0" shows that there are zero moving images.

A user may operate the mouse 15 to move an up button 44 or a down button 45 to scroll the time periods displayed on the screen upwards or downwards, respectively. When the user clicks on a media time bar with the pointer 43, the CPU 1 will display, in a predetermined position (display area) on the screen, at least one thumbnail of an image having a recording-start time (the time when recording had started or will start) closest to the clicked time period. To send a command to the CPU 1, the user may keep the pointer 43 still for a predetermined amount of time, instead of carrying out a clicking action.

[Display Operation]

The display operation of an image recorder having the above-described structure will now be described below.

Figure 3:
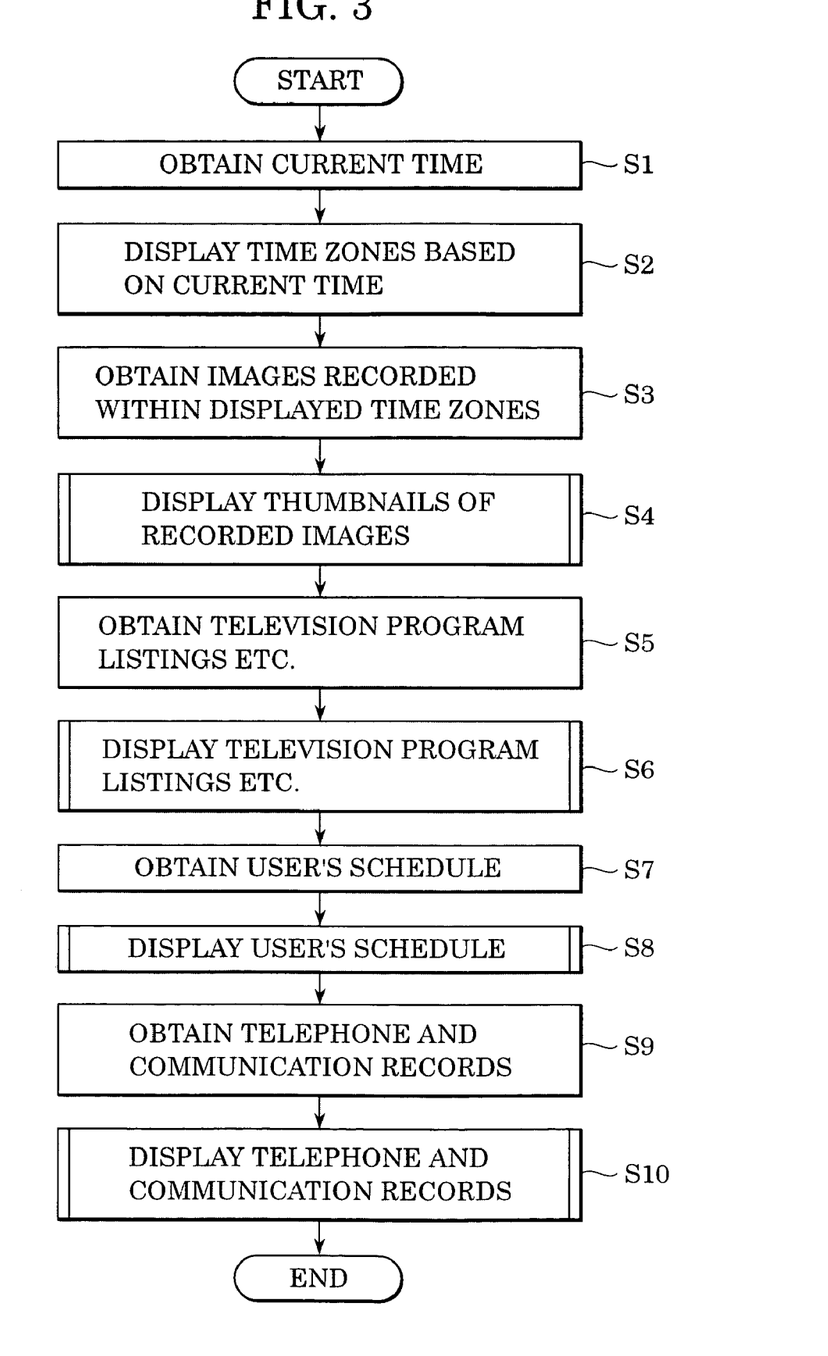
FIG. 3 is a flow chart describing the steps of a display process for displaying the record management screen illustrated in FIG. 2.

FIG. 3 is a flow chart describing the steps of a display process for displaying the record management screen illustrated in FIG. 2. The processing program for this operation is stored on the hard disk 6 in the image recorder and is executed by the CPU 1 when commanded by a user.

First, the current time is obtained by the real-time clock 5 (Step S1). Based on the obtained current time, the time period column 31 is displayed on the screen of the CRT display 3 (Step S2). As described above, the current time is displayed on the time period column 31 at a position indicated by the triangular marker 38 at the center of the screen.

The CPU 1 obtains images having a recording-start time within the displayed time periods, in other words, image data stored on the hard disk 6 of images captured by the digital camera 13 or the video camera 14 (Step S3). Thumbnails of the acquired image data are produced and displayed on the media time bars at a position in which their recording-start times correspond to the time periods indicated by the time period column 31 (Step S4). More specifically, thumbnails of static and moving images captured by the digital camera 13 are displayed in the media time bar 32, and thumbnails of static and moving images captured by the video camera 14 are displayed in the media time bar 33. As described above, when it is difficult to display a plurality of thumbnails in a time period, at least one thumbnail of the images is displayed and indications showing of the number of the other images are displayed (e.g., the indications "P5" and "M0" illustrated in FIG. 2). The thumbnail to be displayed may be selected by the user from the images captured by the same system. When the selected image has already been printed out, an indication "P" (standing for 'printed') is displayed together with its thumbnail. When the selected image has already been stored on a data recording medium, such as a DVD, an indication "R" (standing for 'recorded') is displayed together with its thumbnail.

Television programs scheduled to be broadcasted in the currently displayed time period are obtained from the television program listing, which has been obtained via television airwaves or the Internet in advance, and information on the recorded television programs and programmed recording are obtained from the hard disk 6 (Step S5). This information is displayed in media time bars 34 and 35 representing television channels 1 and 6, respectively (Step S6) (refer to FIG. 2). The process for displaying this information in the media time bars 34 and 35 will be described in detail below.

A user's schedule stored on the PDA 12 can be transferred to the hard disk 6 (Step S7). Then, the schedule transferred to the hard disk 6 can be read out and displayed in a media time bar 36 (Step S8). The process for displaying the schedule in the media time bar 36 will be described in detail below. Telephone records of the telephone 9 and E-mail records (communication records) are read out from the hard disk 6 (Step S9). The read out telephone and communication records are displayed in a media time bar 37 (Step S10). The process for displaying this information in the media time bar 37 will be described in detail below. Subsequently, the CPU 1 ends the process.

Next, a case in which the digital camera 13 or the video camera 14 is connected to the image recorder, and thumbnails of the images recorded by the digital camera 13 or the video camera 14 are additionally displayed in the media time bars 32 and 33 will now be described.

Figure 4:
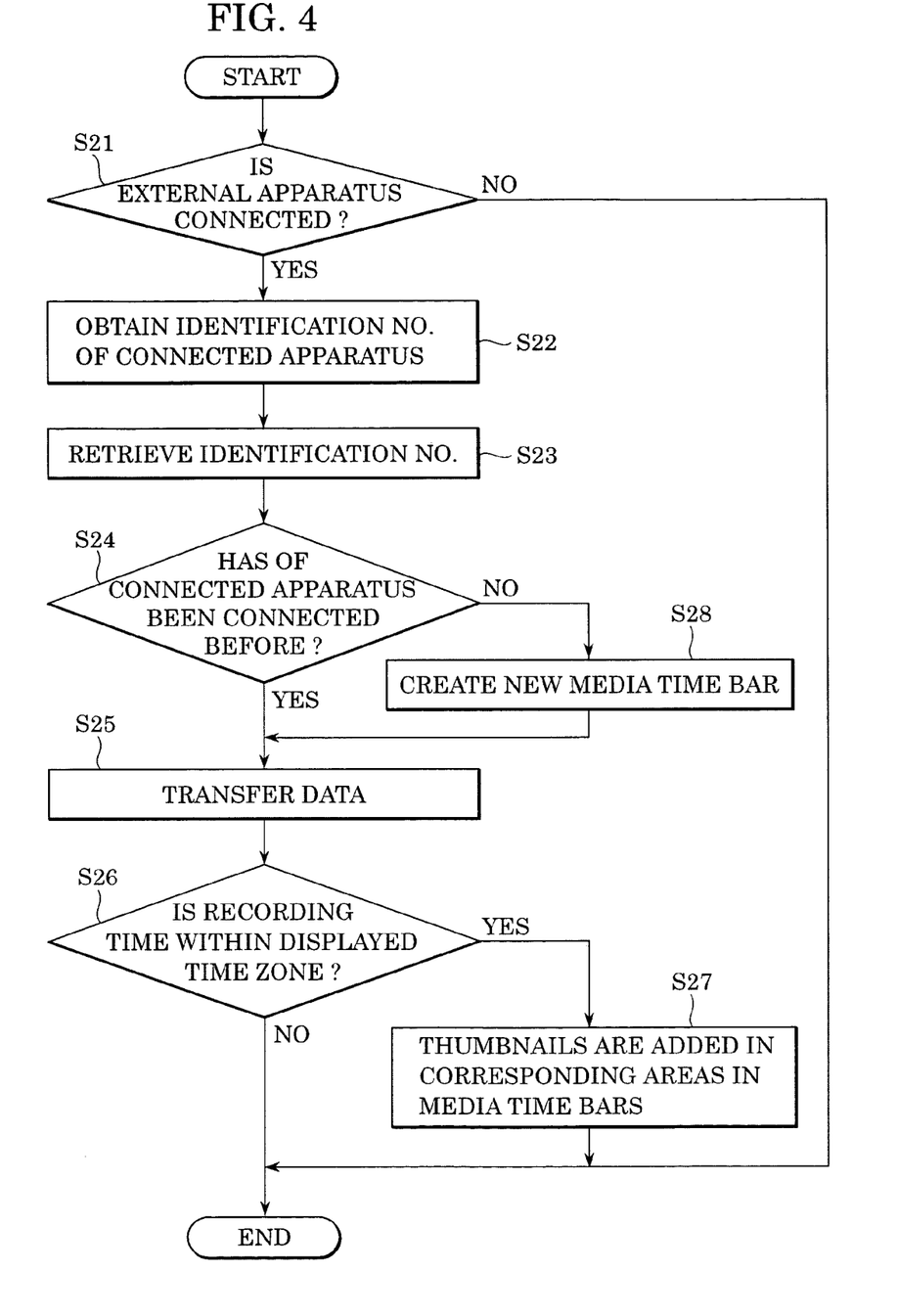
FIG. 4 is a flow chart describing the steps of an additional display process for when a digital video camera 13 or a video camera 14 is connected to an image recorder.

FIG. 4 is a flow chart describing the process for additionally displaying thumbnails of images when the digital camera 13 or the video camera 14 is connected to the image recorder in accordance with an embodiment of the present invention. The process is exemplarily embodied in a program stored on the hard disk 6 of the image recorder. Upon user initiation, the program is executed by the CPU 1.

In FIG. 4, first, it is detected whether the digital camera 13 or the video camera 14 (hereinafter referred to as an 'external device') is connected to the image recorder (Step S21). If so, the CPU 1 communicates with the external system via the USB interface 10 (or the IEEE1394 interface 11) to obtain the identification number of the connected external system (Step S22).

The CPU 1 searches the hard disk 6 for a record of the external device based on the identification number of the external device obtained in Step S22 (Step S23). Then, the CPU 1 determines whether the identification number obtained in Step S22 is stored on the hard disk 6 (Step S24). If the CPU 1 locates the identification number from the hard disk 6, it means that the external device was previously connected to the image recorder and images captured by the device are stored on the hard disk 6. Then, at Step S25, the image data is transferred from the external device (digital camera 13 or video camera 14) to the hard disk 6. Accordingly, the time stamps attached to the image data are referenced to determine whether the images belong to the time period of the time period column 31 displayed on the screen (Step S26). If so, thumbnails of the images are additionally displayed in predetermined areas (areas representing the record-starting time) in the corresponding media time bars (Step S27), after which the process is ended. In this manner, thumbnails of the image data transferred from an external device are displayed in the corresponding media time bars. If, in Step S26, the images do not belong to the time period represented by the time period column 31, the process is ended.

If, in Step S24, an identification number is not retrieved or, in other words, the hard disk 6 does not have any record of the image recorder being connected to the external device, the CPU 1 creates a media time bar (Step S28). After the connected external device and the media time bar are associated, the process proceeds to Steps S25 and S26, previously described. In this way, the image recorder can link any external device to a media time bar.

Reference will now be made to Steps S6 through S10 of FIG. 3 to further elaborate on display of television program listings, user schedules and telephone and communication records.

In FIG. 3, Step S6, the CPU 1 displays the media time bars 34 and 35 if the hard disk 6 stores recordings of television programs of channels 1 and 6. The CPU 1 selects television programs that have or will be broadcasted in the time period represented by the time period column 31 from the television program listing stored on the hard disk 6 and displays the name of these television programs at a position corresponding to the time the television programs were or will be broadcasted in the media time bars 34 and 35.

At this time, television programs that already have been broadcasted are displayed above the triangular marker 38 indicating the current time. On the other hand, television programs that have not yet been broadcasted are displayed below the triangular marker 38. The hard disk 6 always stores the television program listing corresponding to the media time bars. When a user operates the mouse 15 to move the pointer 43 onto the up button 44 or the down button 45 and clicks the mouse 15, the time period column 31 is scrolled upwards or downwards, respectively. If the up button 44 is clicked, the displayed time periods are scrolled backward to past time periods. On the other hand, if the down button 45 is clicked, the displayed time periods are scrolled forward to future time periods. If the triangular marker 38 is clicked, the screen returns to a normal display mode in which the current time is displayed at the center of the screen.

The media time bar 34 for the television channel 1 displays the television program names of "NEWS Weather Report," scheduled to be broadcasted from 17:00 to 17:50, "Japanese Movies," scheduled to be broadcasted from 18:00 to 19:00, and "Special Program," scheduled to be broadcasted from 19:00.

A user can perform programmed recording of television programs. The CPU 1 records, on the hard disk 6, the television program received through the television tuner 7 during the period of time indicated by the time period specified by the user. The information required for programmed recording can be selected via the user interface by clicking on the television program listing obtained in advance or can be input as text via a keyboard. The information required for programmed recording may also be transferred from a PDA. Programmed recording may also be set by receiving a programmed recording schedule via a cellular phone or via the Internet by E-mail. When E-mail is used for programmed recording, the E-mail message containing the information required for programmed recording will include a predetermined code so that the E-mail message can be distinguished from other regular E-mail messages.

FIG. 2 illustrates an area 46 representing a time period scheduled for programmed recording. The CPU 1 colors the area 46 with a predetermined color and displays the colored area 46 on the CRT display 3. In this way, a user can easily check the time period for which programmed recording is scheduled and the television program to be recorded. By referring to the media time bar 36 according to this embodiment, the user can confirm that the user is watching the television program broadcasted on the television channel 1 from 18:00 while recording the program. When the media time bar for a television channel that is currently being recorded is displayed, the CPU 1 displays a crossbar 49 on the media time bar in a predetermined color.

In addition to the time periods scheduled for programmed recording, the CPU 1 also displays areas of time periods corresponding to television programs that already have been recorded in predetermined colors. For example, an area 46a of the area 46 has been recorded while area 46b of the television program is yet to be recorded. For a television program that already has been recorded, the CPU 1 displays the corresponding area in the media time bar in a predetermined color and also displays the required hard disk capacity for recording the program and the total amount of recording time. For example, by looking at an area 50 that corresponds to a 50-minute television program "MUSIC LIVE!" broadcasted on the television channel 6, the user can confirm that 3 giga bytes of the hard disk 6 has been used to record the program.

In Step S8 for displaying the user's schedule in the media time bar 36, information concerning the user's schedule, such as a log of when the user has used the image recorder and other events concerning the user, is displayed. When the user connects the PDA 12 to the USB interface 10, the CPU 1 transfers the information concerning the user's schedule stored on the PDA 12 to the hard disk 6 and then includes this information in the record management screen displayed on the CRT display 3. In this embodiment, the user is scheduled for a walk from 17:00 and then plans to watch a television program on the television channel 1. Furthermore, the user is scheduled to eat dinner from 19:15 to 19:40.

The CPU 1 displays the time of the hour the user connected the digital camera 13 or the video camera 14 to the image recorder in the media time bar 36. An area 51 illustrated in FIG. 2 indicates that the user has connected the video camera 14 to the image recorder. An area 52 illustrated in FIG. 2 indicates that the user connected the digital camera 13 to the image recorder.

The image recorder can playback images while recording a television program. As shown, the user is currently watching a television program broadcasted on the television channel 1. The area 46 representing the currently broadcasted television channel and an area 53 representing the user's dinner time are in the same time period. The CPU 1 determines that the user's schedule and the program currently being recorded are in the same time period and indicates, using a double-headed arrow 55, the period of time in which the user's schedule and the program currently being recorded overlap. If the user decides to watch the television program being recorded after finishing the scheduled dinner and actually starts watching the television program while the program is being recorded, a scheduled time 54 for the end of the television program will be displayed on the screen (in this embodiment, the scheduled time 54 is 19:40).

In Step S10 for displaying the E-mail records and the telephone records in the media time bar 37, the E-mail records (communication records) and the telephone records are displayed in the media time bar 37. The CPU 1 stores these records on the hard disk 6. The CPU 1 can store a telephone number list predetermined by the user on the hard disk 6. In this embodiment, the communication and telephone records are displayed using the names of which the telephone numbers belong to. The CPU 1 also stores information on read and unread messages stored on the hard disk 6 and displays this information when required. In FIG. 2, a record indicating that the user telephoned 'John' at 17:10 and received an E-mail message from 'Ken' at 17:45 is shown. An indicator "[U]" shows that the E-mail message is unread. For E-mail messages, instead of displaying a thumbnail, the subject and a part of the body of the message can be displayed.

In this way, on the record management screen of the image recorder according to this embodiment, the media time bar 32 for displaying a list of images captured by the digital camera 13, the media time bar 33 for displaying a list of images captured by the video camera 14, the media time bars 34 and 35 for displaying the television program listings for each television channel, the media time bar 36 for displaying the user's schedule, and the media time bar 37 for displaying the telephone and communication records are aligned with each other and with the time period column 31 indicate time relationships of various information including recorded or to be recorded information. In this way, the chronological relationship between images captured by the digital camera 13 and the video camera 14 and recorded images of television programs can be easily comprehended. Furthermore, by managing the user's schedule together with the other information, the relationship between the user's schedule and the recorded images can also be grasped. In this way, a user can be prevented from recording the same images twice.

Image data stored on the hard disk 6 can be printed out from the printer 4 when desired by the user. The hard disk 6 stores the file names of the images that have already been printed out. If the image represented by a thumbnail has already been printed out, the CPU 1 displays a "P" mark 58 together with the thumbnail in the media time bar (media time bar 32 in FIG. 2). In this way, the user will be prevented from mistakenly printing out the image twice. Similarly, when recorded images, captured images, and audio have been recorded on a recording medium, such as a DVD medium, by connecting a DVD-RW drive to the image recorder, an "R" mark is displayed on the media time bar to prevent the user from deleting unsaved data from a hard disk or a memory card.

An advantage of the present invention is that a user can understand the chronological relationship between recorded television programs on the one hand, and images captured by various imaging devices (e.g. digital cameras and digital video cameras) on the other hand. Another advantage is that the chronological relationship between images captured by different systems and a user's schedule can be grasped. Another advantage is that the chronological and mutual relationships between image data, television program listings, television programs that have been recorded, television programs that have been broadcasted, and a user's schedule can be easily grasped. Moreover, by displaying thumbnails, a desired image can be easily retrieved from a large amount of image data stored on a hard disk. Also, the total number of images (static and moving images) that have been captured in a particular period of time can be easily determined. Another advantage is that operations for programmed recording can be reliably performed. Also, wasteful printouts can be prevented. Moreover, a user's schedule can be easily managed by transferring the user's schedule from a PDA to the image recording system of the present invention.

In the above, an embodiment of the present invention has been described. However, the present invention is not limited to the descriptions above and may be applied to any structure achieving the functions according to the aspects of the present invention or the functions according to the embodiment of the present invention.

For example, the image recorder according to the present invention may include another networking unit and may connect to a local area network (LAN) via wire communication or wireless communication and display web sites obtained from the Internet or programs delivered through a network by inputting information concerning the web sites and programs using a keyboard. In the above-described embodiment, a digital camera was directly connected to the image recorder via an USB interface. However, instead of the USB interface, the image recorder may be connected to a card reader, and a memory card storing the images captured by the digital camera may be read using this card reader.

Other Embodiments

The object of the present invention can also be achieved by providing a storage medium storing program codes for performing the aforesaid processes to an image sensing system or system, reading the program codes, by a CPU or MPU of the image sensing system or system, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a CPU of the image sensing system or system, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the image sensing system or system or in a memory provided in a function expansion unit which is connected to the image sensing system or system, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowchart of FIG. 3 or 4 described in the embodiments.

The present invention is not limited to the above embodiments and various changes and modifications can be made within the spirit and scope of the present invention. Therefore to apprise the public of the scope of the present invention, the following claims are made.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-415695 filed Dec. 12, 2003, which is hereby incorporated by reference herein.

What is claimed is:

1. An image recorder comprising:

an image-recording unit which records images acquired from different image-obtaining units and comprises a television program-recording unit which records television programs being broadcasted and an image input unit which inputs images having additional time information to the image-recording unit;

a time period displaying unit which displays time periods for indicating time on a screen and comprises a clock unit which measures time, the time period displaying unit updates the time periods displayed on the screen based on the measured time;

a recorded image-displaying unit which displays information about the images recorded by the image-recording unit on the screen for each of the different image-obtaining units so that a time related to each of the images acquired from the image-obtaining units is displayed in accordance with the time indicated by the time periods, and comprises a recorded-program-displaying unit which displays the time the television program was broadcasted in accordance with the time indicated by the time periods and an input image-displaying unit which displays information of the images input by the image input unit on the screen so that the additional time information is displayed in accordance with the time indicated by the time periods;

a connecting unit which connects an external system to the image recorder; and an identifying unit which identifies the external system connected to the image recorder, wherein the image input unit inputs images transferred from the external system connected to the image recorder, wherein the recorded image-displaying unit displays the information of the images input by the image input unit in a row along the time periods displayed on the screen based on the time information added to the images input by the image input unit, and wherein when the results of the identification of the identifying unit indicate that an image transferred from the external system has already been recorded, an image newly transferred from the external system is additionally displayed by the image-recording unit in the same row as the images recorded.

2. The image recorder according to claim 1, wherein the different image-obtaining units comprise one or more of a digital camera, a video camera, a television tuner, an E-mail system and a memory card reader.

3. The image recorder according to claim 1, further comprising:

a schedule information input unit which inputs schedule information to the image-recording unit; and a schedule display unit which displays the schedule information on the screen so that the time included in the schedule information is displayed in accordance with the time indicated by the time periods.

4. The image-recording unit according to claim 3, further comprising:

a connecting unit which connects an external system to the image recorder, wherein the schedule information input unit inputs the schedule information transferred from the external system connected to the image recorder.

5. The image recorder according to claim 1, further comprising:

a communication unit which enables communication; and a communication record-storing unit which stores communication records of the communication carried out via the communication unit, wherein the recorded image-displaying unit comprises a communication record-displaying unit which displays the communication records on the screen so that the time the communication was carried out is displayed in accordance with the time indicated by the time periods.

6. The image recorder according to claim 1, further comprising:

an E-mail transmitting and receiving unit which transmits and receives E-mail messages; and a transmission and reception record storing unit which stores the transmission and reception records of the E-mail messages, wherein the recorded image-displaying unit comprises a transmission and reception record-displaying unit which displays the transmission and reception records on the screen so that the time the E-mail messages were transmitted or received is displayed in accordance with the time indicated by the time periods.

7. The image recorder according to claim 1, further comprising:

a tuning unit which receives a television program to be broadcasted; and a programmed-recording unit which programs recording of the television program to be broadcasted;

wherein the recorded image-displaying unit comprises a television program listing-displaying unit which displays information required for programming the recording of the television program to be broadcasted on the screen so that the time the television program is to be broadcasted is displayed in accordance with the time indicated by the time periods.

8. The image recorder according to claim 7, wherein the programmed-recording unit programs the recording of the television program to be broadcasted by receiving an E-mail message.

9. The image recorder according to claim 7, wherein the information of the television programs, the information of the images input by the image input unit, the schedule information, communication records, transmission and reception records of E-mail messages, and the information required for programming the recording of the television program to be broadcasted are displayed chronologically.

10. The image recorder according to claim 1, wherein the input image display unit displays thumbnails of the images input by the image input unit.

11. The image recorder according to claim 1, wherein the input image display unit displays the number of static images and the number of moving images as information of the images input by the image input unit.

12. The image recorder according to claim 11, further comprising:

an operating unit for indicating a predetermined position on the screen;

wherein, when the number of static images or the number of moving images is indicated by the operating unit, the input image-displaying unit displays at least one of the indicated images as a thumbnail.

13. The image recorder unit according to claim 1, further comprising:

an operating unit for indicating a predetermined position on the screen;

wherein, when a time in one of the displayed time periods is indicated by the operating unit, the input image-displaying unit displays a thumbnail of an image having additional time information close to the time indicated by the operating unit.

14. The image recorder according to claim 1, further comprising:
a schedule information input unit which inputs schedule information to the image-recording unit;
a tuning unit which receives a television program to be broadcasted; and
a programmed-recording unit which programs recording of the television program to be broadcasted;
wherein, when the information required for programming the recording of the television program to be broadcasted and the schedule information are compared with each other and are determined to have overlapping time periods, the recorded image-displaying unit displays an indication on a television program listing displayed on the screen for indicating the overlap.

15. The image recorder according to claim 1, further comprising:
a printing unit which prints out at least one of the images input by the image input unit;
wherein, when at least one of the images input by the image input unit are printed out, the input image-displaying unit displays the information on the images input by the image input unit together with an indication indicating that the image has been printed out.

16. An image recording method comprising:
recording images acquired from different image-obtaining units and television programs being broadcasted;
inputting images having additional time information transferred from an external system connected to the image recorder;
displaying time periods for indicating time on a screen;
updating the time periods displayed on the screen based on the measured time measured by a clock unit;
displaying a time of the television program broadcasted in accordance with the time indicated by the time periods and information of the input images on the screen so that the additional time information is displayed in accordance with the time indicated by the time periods in a row along the time periods displayed on the screen based on the time information added to the images input by the image input step; and
identifying the external system connected to the image recorder,
wherein in a case that the results of the identification of the identifying step indicate that an image transferred from the external system has already been recorded, an image newly transferred from the external system is additionally displayed in the same row as the images recorded.

17. The method of claim 16, further comprising:
receiving information about a user's schedule; and
displaying the user's schedule relative to the time periods to provide a chronological relationship between the user's schedule and the images based on the time periods.

18. A computer-readable recording medium storing a computer executable program wherein, when executed, the program causes program stored on a recording medium and causing a computer to execute the image recording method according to claim 16.

19. A system for displaying a recorded image comprising:
image-recording means for recording images acquired from different image-obtaining means and comprises television program-recording means for recording television programs being broadcasted and image input means for inputting images having additional time information to the image-recording means;
time period displaying means for displaying time periods for indicating time on a screen and comprises clock means for measuring time, the time period displaying means updates the time periods displayed on the screen based on the measured time;
recorded image-displaying means for displaying information about the images recorded by the image-recording unit on the screen for each of the different image-obtaining means so that a time related to each of the images acquired from the image-obtaining means is displayed in accordance with the time indicated by the time periods, and comprises recorded-program-displaying means for displaying the time the television program was broadcasted in accordance with the time indicated by the time periods and input image-displaying means for displaying information of the images input by the image input means on the screen so that the additional time information is displayed in accordance with the time indicated by the time periods;
connecting means for connecting an external system to the image recorder means; and
identifying means for identifying the external system connected to the image recorder means,
wherein the image input means inputs images transferred from the external system connected to the image recorder,
wherein the recorded image-displaying means displays the information of the images input by the image input means in a row along the time periods displayed on the screen based on the time information added to the images input by the image input means, and
wherein when the results of the identification of the identifying means indicate that an image transferred from the external system has already been recorded, an image newly transferred from the external system is additionally displayed by the image-recording unit in the same row as the images recorded.

20. The system of claim 19, further comprising:
schedule receive means for receiving information about a user's schedule; and
schedule display means for displaying the user's schedule relative to the time periods to provide a chronological relationship between the user's schedule and the images based on the time periods.

* * * * *